United States Patent [19]

Satoh et al.

[11] Patent Number: 4,480,711
[45] Date of Patent: Nov. 6, 1984

[54] FRONT SUSPENSION OF LIGHT VEHICLE

[75] Inventors: Kazuo Satoh, Saitama; Katsuyoshi Kawasaki, Tokyo, both of Japan

[73] Assignee: Honda Giken Kogyo Kabushiki Kaisha, Tokyo, Japan

[21] Appl. No.: 426,249

[22] Filed: Sep. 29, 1982

[30] Foreign Application Priority Data

Oct. 29, 1981 [JP] Japan ................................ 56-174340

[51] Int. Cl.$^3$ ........................ B62D 61/08; B62K 5/02; B62K 11/02
[52] U.S. Cl. .................................... 180/215; 180/219; 280/276; 280/282
[58] Field of Search ............... 180/215, 216, 210, 219; 280/279, 282, 276, 277

[56] References Cited

U.S. PATENT DOCUMENTS 4,159,752  7/1979  Kanno ................................. 280/282

FOREIGN PATENT DOCUMENTS 813001  9/1951  Fed. Rep. of Germany ...... 280/279
1175885  4/1959  France ................................ 180/215
3568AD  of 1894  United Kingdom ............. 280/281 R Primary Examiner—John A. Pekar
Attorney, Agent, or Firm—Irving M. Weiner; Pamela S. Burt; Anthony L. Cupoli

[57] ABSTRACT

A front suspension of a light vehicle having a single front wheel supported on one side thereof with a single supporting member and offset to one side of the center line of the vehicle.

In this manner, the inclining tendency of the vehicle is reduced and the rectilinear travel of the vehicle is maintained, notwithstanding the imbalanced weight of the steering structure resulting from supporting the front wheel on one side thereof through a single support system.

2 Claims, 5 Drawing Figures

FRONT SUSPENSION OF LIGHT VEHICLE

BACKGROUND OF THE INVENTION

1. Field of the Invention

The present invention relates to a front suspension of a light vehicle and more particularly to a front suspension of a light motor vehicle having a front wheel arranged so that unfavorable effects of single support, in which the front wheel is supported with a supporting member either on the right side or on the left side thereof, can be eliminated.

2. Description of Relevant Art

In a motorcycle equipped with an engine, there is a known front suspension which is adapted to support the front wheel with a single supporting member disposed either on the right side or on the left side of the front wheel in order to provide a reduced vehicle weight, simplified assembling work and improved accessibility as compared with a commonly used front suspension, in which the front wheel is supported with a front fork both on the right and left sides thereof.

In such a single support front suspension, since the front wheel supporting member is offset to the right or left with respect to the center line of the vehicle passing through the front and rear wheel, the structure of the steering system including the supporting member is unbalanced in weight and is, therefore, liable to turn in one direction, since the structure of the steering system is pivotally joined to the body structure including the body frame. In order to ensure the rectilinear travelling capability of a motorcycle, the front wheel supporting member is disposed at a caster angle. The combined effect of the caster angle and the turning tendency of the structure of the steering system causes a torsional force to act on the body structure. Consequently, the entire vehicle is subject to an inclining action. Accordingly, in a motorcycle employing a single support type front suspension, the displacement of the center of gravity of the entire motorcycle from the center line of the entire motorcycle resulting from the offset center of gravity of the structure of the steering system is corrected by the inclination of the entire motorcycle in the balancing direction so that the motorcycle travels in an inclined position thus maintaining dynamic balance. In another motorcycle, the center of gravity of the body system is intentionally displaced taking the imbalanced weight of the structure of the steering system into consideration.

The present invention is capable of eliminating the above-described effect of unbalanced weight of the single support type front suspension for three-wheeled vehicles, not to mention two-wheeled vehicles.

SUMMARY OF THE INVENTION

In a light motor vehicle having a single front wheel supported on one side thereof with a supporting member disposed either on the right side or on the left side of the front wheel, the present invention provides a front suspension adapted to support the front wheel at a position offset either to the right or to the left with respect to the longitudinal center line of the vehicle.

Accordingly, an object of the present invention is to provide a front suspension of a vehicle, capable of avoiding the inclined position of the vehicle notwithstanding the unbalanced weight of the supporting member resulting from the single support construction or capable of allowing rectilinear running of the vehicle.

These and other objects and advantages of the present invention will become more apparent from the detailed description of the preferred embodiment in connection with appended drawings.

DETAILED DESCRIPTION OF THE INVENTION

Figure 1:
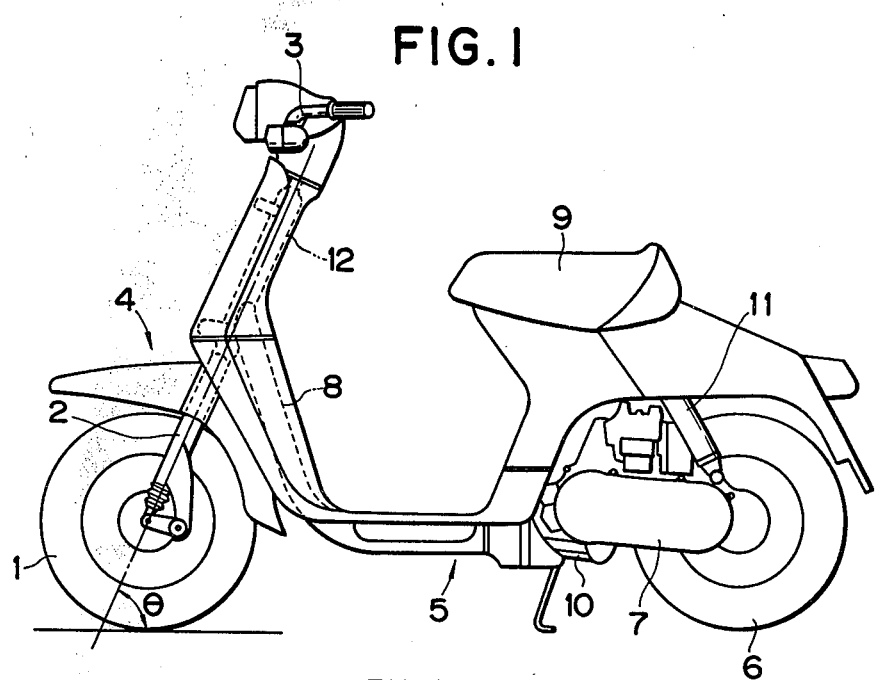
FIG. 1 is a side elevation of a two-wheeled motor scooter employing a front suspension according to the present invention.
Figure 2:
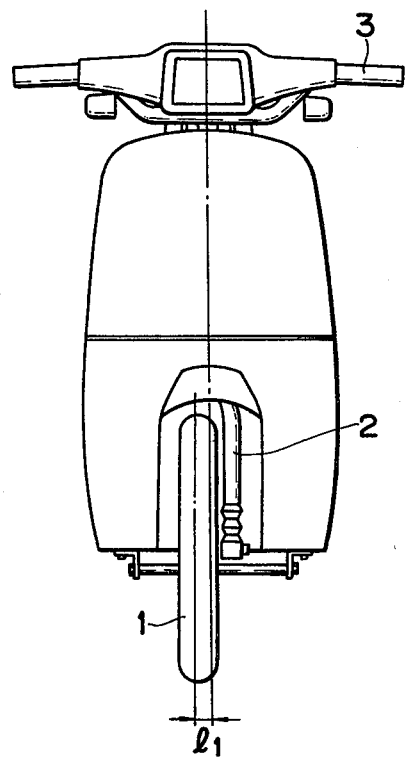
FIG. 2 is an elevation of the motor scooter of FIG. 1.

Referring to FIGS. 1 and 2, a front wheel 1 is pivotally supported at the lower end of a supporting member 2 having a shock absorber mechanism. The supporting member 2 is disposed on one side of the front wheel 1 as illustrated in FIG. 2 so that the front wheel 1 is supported with the supporting member 2 in the manner of single support. As shown in FIG. 1, the supporting member 2 is inclined in a clockwise direction to form a caster angle $\theta$ with respect to a horizontal line as usual in ordinary motorcycles. A steering bar 3 is attached on top of the supporting member 2. The supporting member 2 and the steering bar 3 constitute a steering structure 4.

A body structure 5 having a rear wheel 6 comprises a power unit 7, a body frame 8, a seat 9. The rear wheel 6 is pivotally supported at the rear end of the power unit 7 incorporating a transmission case containing a chain and other transmission members for transmitting the engine power to the rear wheel 6. The power unit 7 is joined to and suspended from the body frame 8 by means of a connecting member 10 and a rear shock absorber 11. A head pipe 12 is fixedly provided on the front end of the body frame 8 at an angle the same with the caster angle. The supporting member 2 is inserted rotatably through the head pipe 12 so that the steering structure 4 is pivotally supported by the body structure 5 for steering motion.

Figure 3:
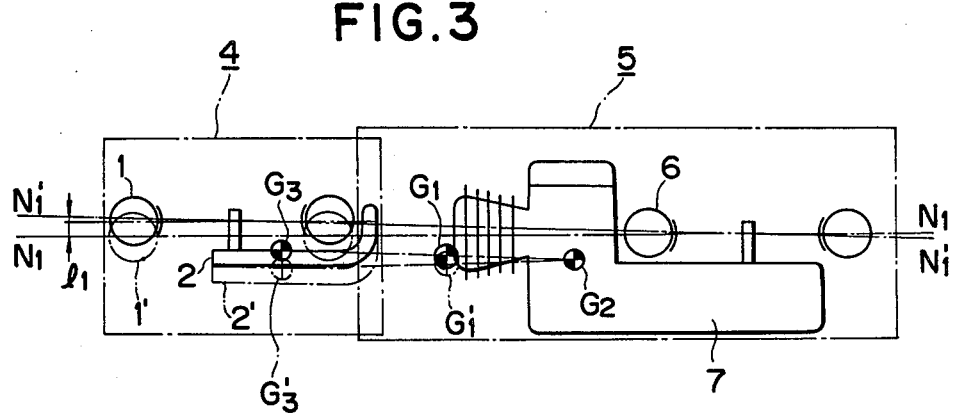
FIG. 3 is a schematic plan view of a preferred embodiment of the present invention, in which the center of gravity of the body structure is deviated from the center line of the vehicle.

FIG. 3 is a schematic plan view of the two-wheeled vehicle as described hereinbefore, in which line N1-N1 is the center line of the vehicle passing through the central part of the front wheel 1' not offset and the central part of the rear wheel 6. The center line N1-N1 is aligned with the rectilinear running direction of the vehicle. In the embodiment of FIG. 3, the center of gravity G2 of the body structure 5 is displaced from the center line N1-N1 of the vehicle either to the right or left with respect to the rectilinear travel direction of the vehicle.

In this embodiment, assuming that the supporting member 2' is disposed on the side of displacement of the center of gravity G2, the steering structure 4 has a tendency to turn in one direction, i.e., in a counterclockwise direction with respect to the rectilinear travel direction of the vehicle of FIG. 3, due to imbalanced weight of the single support mechanism of the steering structure. This turning tendency and the caster angle θ cause the steering structure 4 to apply a rightward torsional force to the body structure 5 so as to raise the vehicle upright from the inclined position resulting from the displacement of the center of gravity G1' of the entire vehicle, which is composed of the center of gravity G2 of the body structure 5 and the center of gravity G3' of the steering structure 4, from the center line N1-N1 of the vehicle. Therefore, the vehicle is dynamically balanced on the equilibrium of the moment of the torsional force and the moment of the gravitational force working on the center of gravity G1' of the entire vehicle and is allowed to travel rectilinearly, however, the vehicle is still inclined.

The vehicle will be better balanced and the inclination of the two-wheeled vehicle in the equilibrated state of the aforesaid moments will be smaller when the deviation of the center of gravity of the entire vehicle from the center line N1-N1 of the vehicle is smaller. Thus, when the front wheel 1' is offset in a direction opposite to the direction of displacement of the center of gravity G2 with respect to the center line N1-N1 by an offset distance $l_1$ together with the supporting member 2, the center of gravity G1' is caused to change to the center of gravity G1 due to the change of the center of gravity G3' to the center of gravity G3 resulting from the offset disposition of the front wheel 1 and the supporting member 2. Since the center of gravity G1 is located at a smaller distance as compared with the distance of the center of gravity G1' from the center line N1-N1 from the new center line N1'-N1', the inclination of the vehicle is reduced and the vehicle is allowed to travel in an approximately upright position.

Incidentally, it is possible to bring the center of gravity closer to the center line N1-N1 of the vehicle to reduce the inclination of the vehicle without offsetting the front wheel 1 by changing the position of the center of gravity of the steering structure from G3' to G3 by increasing the weight of the steering structure 4, however, the increase in the weight of the steering structure 4 results in an increase in the moment of inertia of the steering structure, which is disadvantageous in operating the steering structure. Offsetting the front wheel 1 will not cause such a problem, and further contributes to the reduction in the weight of the steering structure.

Figure 4:
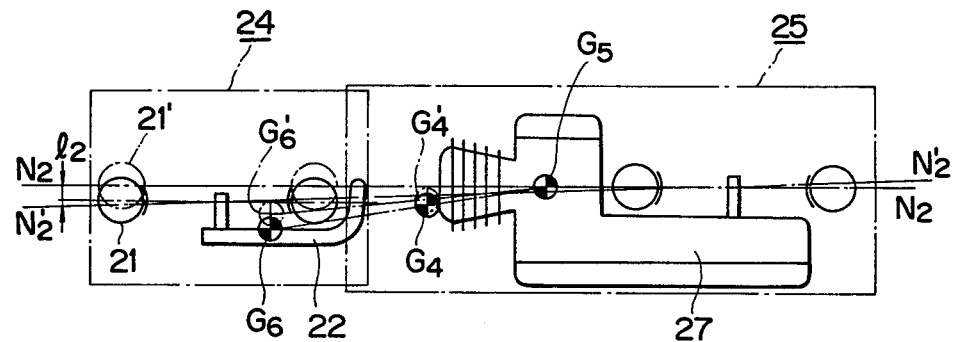
FIG. 4 is a view, similar to FIG. 3, of a preferred embodiment of the present invention, in which the center of gravity of the body structure lies on the center line of the vehicle.

FIG. 4 is a plan view of a second embodiment, in which the center of gravity G5 of the body structure 25 lies on the center line N2-N2 of the vehicle. Such a condition can be attained by properly distributing the respective weights of the component members of the body structure 25 except the power unit 27. In this embodiment, the front wheel 21 is offset by an offset distance $l_2$ from the center line N2-N2 of the vehicle on the side of the supporting member. The steering structure 24 has a tendency to turn counterclockwise due to the imbalanced weight of the steering structure 24. Accordingly, this turning tendency and the caster angle cause the steering structure 24 to apply a rightward torsional force to the body structure 25. In this case, when the front wheel 21 is disposed at a front wheel position 21' where the front wheel is aligned with the center line of the vehicle, the entire vehicle will travel diagonally rightwardly due to the rightward inclination of the body structure 25. In order to prevent such diagonal travel characteristic, the front wheel 21 is offset to change the position of the center of gravity G6' of the steering structure 24 to a position G6 so that the center of gravity G4' of the entire vehicle is changed to a new center of gravity G4, which is closer to the new center line N2'-N2' of the vehicle. Consequently, the above-mentioned inclination of the body structure 25 is prevented and thus the vehicle is allowed to travel rectilinearly.

Figure 5:
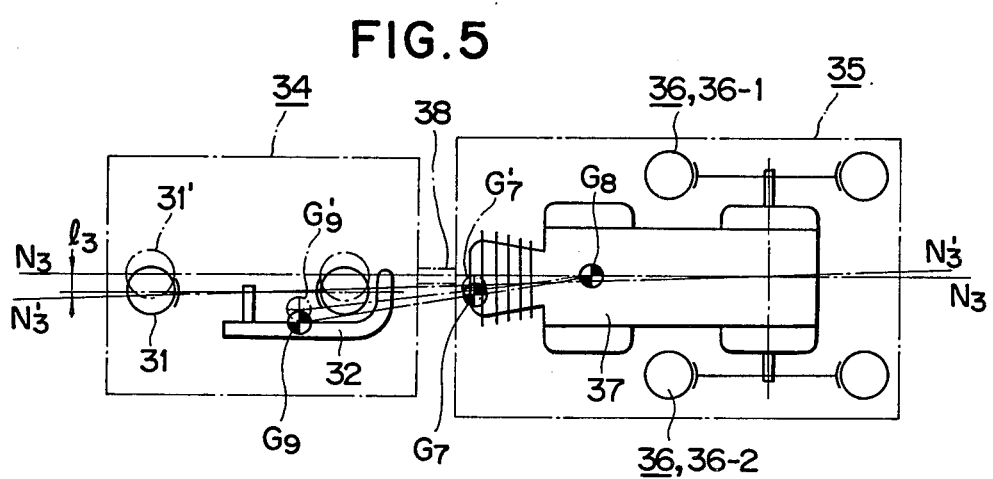
FIG. 5 is a view, similar to FIG. 3, of a preferred embodiment of the present invention as applied to a three-wheeled vehicle.

FIG. 5 is a schematic plan view of a third embodiment of the present invention as applied to a three-wheeled vehicle having right and left rear wheels 36 driven by a power unit 37. The three-wheeled vehicle comprises a front body 34 including a front wheel 31 and a rear body 35 including the rear wheels 36-1 and 36-2. The front body 34 and the rear body 35 are joined relatively swingably within a horizontal plane with a swing joint 38. Practically, the swing joint 38 consists of an outer tube and an inner tube rotatably fitted in the outer tube and the axial direction of the inner and outer tubes is inclined at an angle to a horizontal line by disposing the front part at a position higher than the position of the rear part to ensure rectilinear travel of the vehicle. Therefore, the vehicle is provided with an angle similar to the caster angle at the swing joint 38. The front wheel 31 and a front wheel supporting member 32 are mounted rotatably on the front body 34 for steering motion. The front wheel 31 is supported on a single side thereof with the supporting member 32. The center of gravity G8 of the rear body 35 lies on the center line N3-N3 of the vehicle. In this embodiment, the center line N3-N3 of the vehicle passes through the central part of the front wheel 31 when it is located at a front wheel position 31' where the front wheel 31 is not offset, and through the middle of the rear wheels 36-1 and 36-2.

The front body 34 has a tendency to turn about the swing joint 38 due to the imbalanced weight thereof as in the case of two-wheeled vehicles. This turning tendency and the aforementioned angle of inclination cause the front body 34 to apply a leftward torsional force to the rear body 35. Consequently, the entire vehicle tends to incline to the left side. Therefore, the vehicle travels diagonally leftwardly in an inclined position. In order to prevent such diagonal travel characteristic of the vehicle, the front wheel 31 is offset from the center line N3-N3 of the vehicle on the side of the supporting member 32 by a distance $l_3$. The center of gravity G9' of the front body 34 thus changes to a new center of gravity G9 so that the center of gravity G7' of the entire vehicle changes to a new center of gravity G7 approaching the new center line N3'-N3' of the vehicle. Thus, the inclination of the vehicle is reduced and the approximately upright position of the vehicle is maintained, whereby the vehicle is allowed to travel rectilinearly.

The tendency of diagonal travelling of a three-wheeled vehicle is also attributable to a slight difference in the driving force between the right rear wheel 36-1 and left rear wheel 36-2. Such a difference in the driving force between the right and left rear wheels occurs, for example, when the right and left rear wheels are interrelated with a simple multiple friction disk differential unit for differential motion.

For example, when the driving force of the right rear wheel 36-1 is greater than that of the left rear wheel 36-2, the rear body 35 tends to turn to the left. Consequently, the front body 34 joined to the rear body 35 with the swing joint 38 tends to turn to the right with respect to the travel direction of the vehicle about the swing joint 38 similarly to the turning motion resulting from the turning tendency. Therefore, the rear body 35 tends to be inclined to the right and the three-wheeled vehicle tends to move diagonally to the right during the initial stage of travel.

In order to solve such problem, the front wheel 31 is offset, as shown in FIG. 5, to the left of the center line N3-N3 of the vehicle, namely, opposite to the right rear wheel 36-1 having a greater driving force, to ensure rectilinear travel of the three-wheeled vehicle.

Such offset disposition of the front wheel for maintaining the rectilinear travelling characteristic of a three-wheeled vehicle is also applicable to a three-wheeled vehicle employing a double support system for supporting the front wheel, however, the rightward turning tendency of the front body 34 can be controlled to a lesser extent by the effect of the imbalanced weight of the supporting member 32 resulting from the disposition of the supporting member 32 on the opposite side with respect to the right rear wheel 36-1, namely, on the left side with respect to the center line of the vehicle, for supporting the front wheel 31 through the single support system. Consequently, the offset distance $l_3$ of the front wheel 31 can be limited to a lesser extent.

It is apparent from what has been described hereinbefore that according to the present invention, the effect of the imbalanced weight of the steering structure resulting from single support of the front wheel with a supporting member can be cancelled by offsetting the front wheel either on the right side or on the left side with respect to the center line of the vehicle so that the inclining tendency of the vehicle is prevented and the rectilinear travel of the vehicle is ensured. Such improvements can be attained without being accompanied by an increase in weight of the component members, such as the supporting member, of the steering structure.

Although there have been described what are at present considered to be the preferred embodiments of the present invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

We claim:

1. A front suspension of a light motor vehicle having a single front wheel supported on one side thereof with a supporting member disposed either on the right side or on the left side of said front wheel, wherein:
   said front wheel is offset either on the right side or on the left side with respect to the longitudinal center line of said vehicle;
   said light motor vehicle is a two-wheeled vehicle;
   the center of gravity of the vehicle body structure including a rear wheel is displaced either to the right or to the left of said center line of said vehicle; and
   said front wheel is supported with said supporting member on the same side as said center of gravity with respect to said center line of said vehicle in a single support system, while said front wheel is offset to the side opposite to the side of displacement of said center of gravity.

2. A front suspension of a light motor vehicle having a single front wheel supported on one side thereof with a supporting member disposed either on the right side or on the left side of said front wheel, wherein:
   said front wheel is offset either on the right side or on the left side with respect to the longitudinal center line of said vehicle;
   said light motor vehicle is a three-wheeled vehicle having a front body including a front wheel and a rear body including a right rear wheel and a left rear wheel, said front and rear bodies being joined for relative swinging motion within a horizontal plane, said rear wheels being driving wheels differing from each other in driving force;
   said front wheel is supported on one side thereof with said supporting member on the side opposite to the side of said rear wheel having a greater driving force with respect to said center line of said vehicle; and
   said front wheel is offset to the same side as the front wheel supporting side with respect to said center line of said vehicle.

* * * * *